Aug. 28, 1934. W. BERG 1,971,638
MOTOR OPERATED CHUCK FOR LATHES AND OTHER MACHINE TOOLS
Filed May 2, 1932
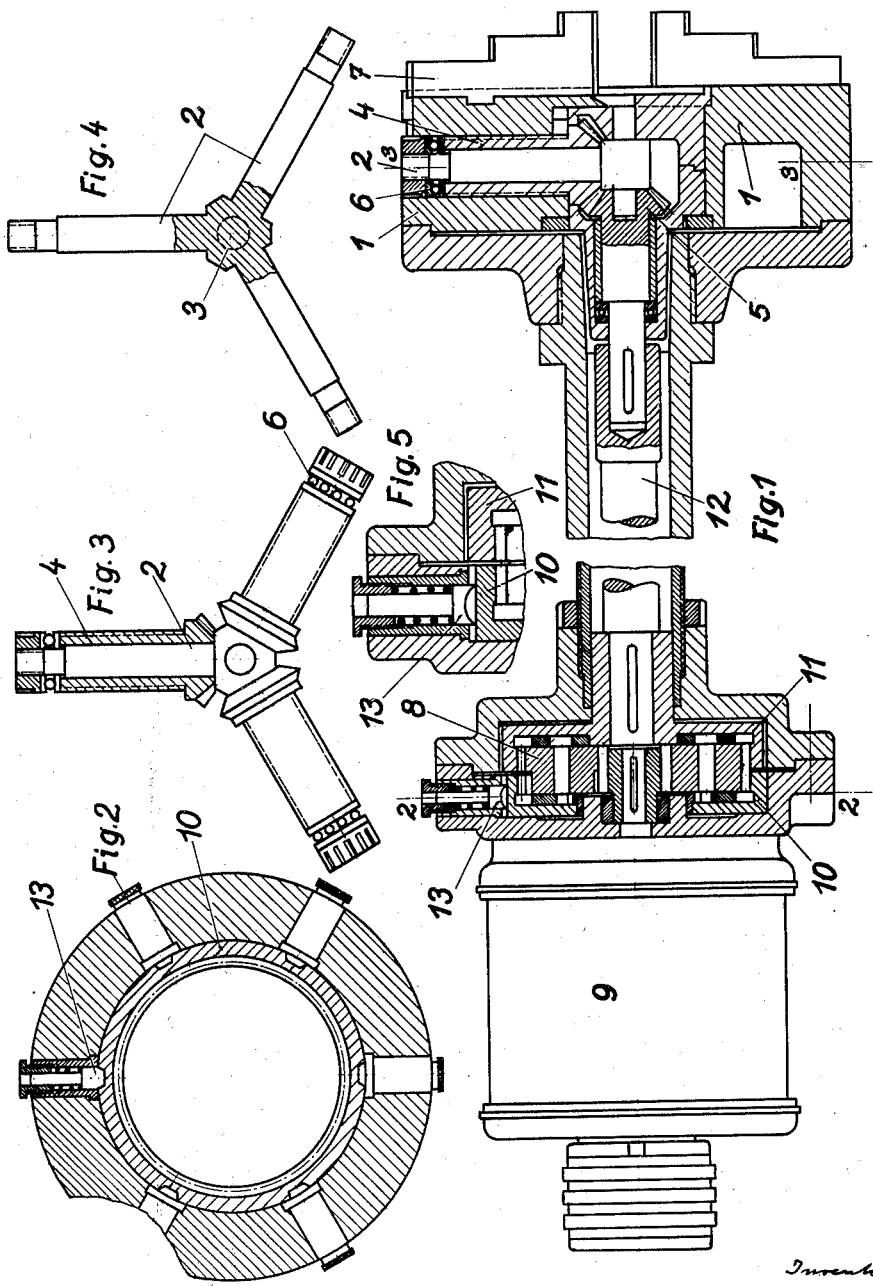

Patented Aug. 28, 1934

1,971,638

UNITED STATES PATENT OFFICE 1,971,638

MOTOR OPERATED CHUCK FOR LATHES AND OTHER MACHINE TOOLS

Wilhelm Berg, Bielefeld, Germany

Application May 2, 1932, Serial No. 608,763
In Germany September 4, 1931

1 Claim. (Cl. 279—112)

The mechanically operated chuck consists of the chuck proper, the transmission shaft, the gearing with the regulating device and the electric motor. All these elements are arranged in alignment to the central axis of the working spindle of the lathe.

The necessity of driving the chuck centrally in order to bring the clamping pressure proper as near as possible to the clamping jaws, of adjusting the clamping jaws for any desired diameter without rearrangement, and finally of obtaining an extremely favourable efficiency of the chuck by taking up the clamping pressure by ball bearings in order to enable a small driving motor to be employed, and also the condition that the chuck always runs absolutely true and works accurately even under the greatest stressing, have all led to a novel construction of the chuck.

Owing to the novel type of suspension of the bearing and of the taking up of the pressure the following advantages are obtained in consequence of the rigid interconnection of all three screw spindles:—

(1) The screw spindles permanently remain at a uniform distance from the centre and from the base wheel which drives the spindles, thus, (2) The clamping jaws always run exactly in a circle and consequently, (3) Absolutely accurate working of the blanks is always obtained.

Owing to this mutual arrangement of the screw spindles with ball thrust bearings in a rigid system only a low power is required as the drive of the chuck can now be effected from the centre from a base wheel on to the bevel wheels which, if necessary, may be made in one piece with the screw spindles, the axial pressure of which spindles is taken up by ball bearings, and consequently the lowest power imaginable is required resulting in very low running expenses and small driving motors.

An embodiment of the invention is illustrated by way of example in the accompanying drawing in which:

Fig. 1 shows in longitudinal section the chuck driven by an electric motor.

Fig. 2 is a cross section on line 2—2 of Fig. 1.

Fig. 3 is a section through the chuck on line 3—3 of Fig. 1.

Fig. 4 shows the axle star.

Fig. 5 is a longitudinal section showing one of the locking bolts.

In the chuck body 1 for example three radial axles 2 made in one piece are inserted. Spindles 4 are rotatably arranged one on each of these axles 2 and driven by a central gear 5. The spindles are held unshiftable in the longitudinal direction by thrust bearings 6 and collars 3 on the middle portion of the axles 2. By rotating the central gear, the spindles are uniformly rotated and the jaws 7 of the chuck uniformly clamped according to the different clamping pressures.

The different clamping pressures on the jaws in the chuck for clamping the blanks are produced in chucks operated by hand, as the experience of operators serving the chuck has shown, by more or less strongly tightening the chuck by hand. Thus, the necessarily very great difference of the clamping pressure could be obtained according to the working operation and the type, shape and size of the blank.

It is to be expected, that the different clamping pressures could be reliably obtained in a similar manner with an electrically operated chuck. The present invention solves this problem by a mechanical regulation of the clamping pressure exerted on a portion of the differential gear. The differential gear 8, which is arranged between the motor 9 and the chuck 1, consists of a base wheel 10 and runner wheel 11 arranged beside the base wheel and connected to the adjusting device of the chuck by a shaft 12. The runner wheel has a slightly different number of teeth to the base wheel. If the base wheel is stopped, the runner wheel rotates and inversely, if the runner wheel is stopped, the base wheel rotates.

The clamping pressure regulating device is based on this fundamental principle. The base wheel 10 is held by spring loaded locking bolts 13 which engage in corresponding conical notches in the circumference of the base wheel (Fig. 2).

By these spring loaded locking bolts the base wheel is held until the prescribed clamping pressure is attained. If this clamping pressure is exceeded, the spring loaded locking bolts yield. The base wheel consequently rotates, whereas the runner wheel remains stationary, so that the clamping of the blank is terminated when a certain clamping pressure is reached without it being necessary to stop the motor.

This mechanical locking of the base wheel may be regulated in various manners. The number of spring loaded locking bolts may be changed or the spring pressure varied. In both cases it is possible to exert by mechanical means a certain clamping pressure on the clamping jaws of always uniform accuracy and desired strength by changing the turning moment of the drive whilst retaining the same motor. If the base wheel is held by one or more locking bolts with a certain spring pressure, a certain turning moment is transmitted to the running wheel, and the instant the circumferential forces exceed the turning moment determined by the locking bolts and springs, the locking bolts provided with conical surfaces are pushed outwards and the base wheel is liberated. This occurs the instant the predetermined clamping pressure is reached in the chuck.

Experiments have shown that with this arrangement the clamping of the blank takes place uniformly, so that the mechanically operated chuck can meet all conditions of the work shop. It is not necessary to change the motor for obtaining different turning moments or to provide different electric resistances. The same motor can be employed for all clamping work. Moreover, the chuck can be exchanged without in any way altering the driving device. Consequently, only one drive is necessary for each machine for any number of chucks.

It is a known phenomenon that the blank tends to turn in the clamping jaws during the working operation owing to the stressing. A greater additional clamping pressure is thereby produced, than that which is applied by the motor or by hand to the clamping jaws. However, this results in that, when disengaging, the first disengaging pressure must be greater than the last clamping pressure.

If therefore a mechanical regulating device were to be employed which does not take this circumstance into consideration the result would be that, when disengaging, a sufficient disengaging pressure could not be transmitted for disengaging the clamping jaws.

Consequently, locking bolts are arranged at certain distances apart around the circumference of the base wheel so that, between the individual notches, the motor can run idle when the locking bolt is disengaged in order to thus accumulate energy in its rotating mass which, when the locking bolt suddenly engages in the base wheel, is converted into a considerably increased turning moment. This sequence repeats itself until the disengagement has been effected.

The minimum spacing of the notches in the circumference of the base wheel is therefore determined by the idle running time of the motor, which is necessary for storing the energies required for disengaging the clamping jaws.

I claim:—

A motor operated chuck for lathes and other tools in which the clamping jaws are operated by screw spindles, comprising in combination with the clamping jaws and the spindles, axles arranged radially and made in one piece having bearing surfaces at their inner ends each carrying one of said spindles, thrust bearings one on the outer end of each axle bearing against the outer end of its coordinate spindle, and a common central gear adapted to drive all said spindles to uniformly shift said clamping jaws.

WILHELM BERG.